(12) United States Patent
Schulz (10) Patent No.: US 11,718,241 B2
(45) Date of Patent: Aug. 8, 2023

(54) REAR CARRIER SYSTEM FOR A MOTOR VEHICLE

(71) Applicant: ATERA GmbH, Leutkirch im Allgäu (DE)

(72) Inventor: Albert Schulz, Isny (DE)

(73) Assignee: ATERA GMBH, Leutkirch im Allgäu (DE)

( * ) Notice: Subject to any disclaimer, the term of this patent is extended or adjusted under 35 U.S.C. 154(b) by 0 days.

(21) Appl. No.: 17/541,583

(22) Filed: Dec. 3, 2021

(65) Prior Publication Data
US 2022/0176885 A1 Jun. 9, 2022

(30) Foreign Application Priority Data
Dec. 8, 2020 (DE) ...................... 10 2020 215 454.6

(51) Int. Cl.
*B60R 9/06* (2006.01)

(52) U.S. Cl.
CPC ...................... *B60R 9/06* (2013.01)

(58) Field of Classification Search
CPC .. B60R 9/06; B60R 9/10; B60R 19/48; B60R 11/00
See application file for complete search history.

(56) References Cited

U.S. PATENT DOCUMENTS

| 2,284,419 | A | * | 5/1942 | Greig | .................... B60R 5/041 224/527 |
| 4,915,276 | A | | 4/1990 | Devito | |
| 7,909,213 | B2 | * | 3/2011 | Bergerhoff | ................ B60R 9/10 224/924 |
| 9,174,584 | B1 | * | 11/2015 | Cha | .......................... B60R 19/48 |
| 9,346,412 | B2 | * | 5/2016 | Cha | .......................... B60R 9/06 |
| 10,086,768 | B2 | * | 10/2018 | Ritter, Jr. | .................. B60R 9/10 |
| 2007/0090142 | A1 | * | 4/2007 | Chuang | ..................... B60R 9/06 224/924 |
| 2008/0142559 | A1 | * | 6/2008 | Lim | ......................... B60R 9/10 224/489 |
| 2010/0001029 | A1 | * | 1/2010 | Tai | ........................... B60R 9/06 224/510 |

(Continued)

FOREIGN PATENT DOCUMENTS

| DE | 4241008 A1 | 2/1994 |
| DE | 60101990 T2 | 1/2005 |
| DE | 102004033809 A1 | 2/2006 |

OTHER PUBLICATIONS

German Office Action issued in corresponding German Application No. 10 2020 215 454.6 dated Jun. 23, 2021 (5 pages).

(Continued)

*Primary Examiner* — Brian D Nash
(74) *Attorney, Agent, or Firm* — Flynn Thiel, P.C.

(57) ABSTRACT

Rear carrier system for a motor vehicle having two carrier receivers which are fixed to the vehicle, and having two carrier profiles which are provided on vehicle-side end regions in each case with a fastening profiling. In a ready-for-operation mounted state, each carrier profile is releasably fastened with the fastening profiling to the assigned carrier receiver. Each carrier profile is provided at a distance from the fastening profiling with a support profiling, wherein in the ready-for-operation mounted state of the carrier profiles the support profilings are positively supported against one another.

17 Claims, 8 Drawing Sheets

(56) References Cited

U.S. PATENT DOCUMENTS

| | | | |
|---|---|---|---|
| 2010/0089957 A1* | 4/2010 | Barth | B60R 9/06 224/539 |
| 2011/0108592 A1* | 5/2011 | Lee | B60R 9/06 224/488 |
| 2012/0024923 A1* | 2/2012 | Cha | B60R 9/06 224/533 |
| 2017/0072866 A1* | 3/2017 | Cha | B60R 9/06 |
| 2022/0176885 A1* | 6/2022 | Schulz | B60R 9/06 |

OTHER PUBLICATIONS

European Search Report issued in corresponding European Application No. 21208477.6 with English translation of categories of cited documents, dated May 9, 2022 (8 pages).

* cited by examiner

REAR CARRIER SYSTEM FOR A MOTOR VEHICLE

CROSS-REFERENCE TO RELATED APPLICATION

This claims priority from German Application No. 10 2020 215 454.6, filed Dec. 8, 2020, the disclosure of which is hereby incorporated by reference in its entirety.

TECHNICAL FIELD

The invention relates to a rear carrier system for a motor vehicle having two carrier receivers which are fixed to the vehicle, and having two carrier profiles which are provided on vehicle-side end regions in each case with a fastening profiling. In the ready-for-operation mounted state, each carrier profile is releasably fastened to its corresponding carrier receiver via the fastening profiling.

BACKGROUND AND SUMMARY

Such a rear carrier system is disclosed in DE 10 2004 033 809 A1. To this end, a passenger motor vehicle has two carrier receivers which are fixedly connected to a body supporting structure in the region of a rear-side fender. In an embodiment according to FIG. 6 the carrier receivers are designed as bayonet closure receivers. Each of the two carrier receivers is assigned a substantially cylindrical carrier profile which is provided on its vehicle-side end region with a complementary bayonet closure portion in order to permit a releasable fixing of each carrier profile to the bayonet closure receiver of each vehicle carrier receiver which is fixed to the vehicle. In the ready-for-operation mounted state the two carrier profiles protrude downwardly to the rear in the longitudinal direction of the vehicle. The rear carrier system is completed by means of a further component which connects together the two carrier profiles and is designed in the form of a crossmember or a functional platform.

The invention provides a rear carrier system of the type mentioned in the introduction which permits a simple and yet functionally reliable construction.

In this regard, each carrier profile is provided at a distance from the fastening profiling with a support profiling, wherein in the ready-for-operation mounted state of the carrier profiles the support profilings are positively supported against one another. Accordingly, no additional component is required in order to connect together the carrier profiles. Instead the two carrier profiles are supported relative to one another in the ready-for-operation mounted state via the support profilings and accordingly form together a stable base in order to be able to support further functional components of the rear carrier system. Corresponding functional components are provided for holding or receiving transported goods, which may be transported together on the rear side of a motor vehicle. At least one leisure device, in particular at least one two-wheeled vehicle, preferably a bicycle or an E-bike, is provided as preferred transported goods for the rear carrier system according to the invention. The functional components which are borne by the two carrier profiles are configured for holding or receiving corresponding transported goods, preferably for holding and supporting at least two bicycles. The two carrier receivers are fixedly connected to a rear-side body supporting structure of the motor vehicle. Preferably, the carrier receivers are arranged on rear-side end regions of longitudinal or transverse members of the body supporting structure of the motor vehicle. The solution according to the invention is particularly advantageously suitable for use in passenger motor vehicles.

In one embodiment, each carrier profile is curved at an angle, wherein the fastening profiling is arranged on a first profile limb and the support profiling is arranged on an angled-back second profile limb. The angled curvature is to be understood to mean both a right-angled portion and a bent portion or an angled-back portion. Preferably, a right-angled curvature is provided. The first and the second profile limbs may be part of a one-part, continuous longitudinal profile, in particular a metal profile, preferably a metal hollow profile. Alternatively, it is possible to produce the first and the second profile limbs separately and to orientate said profile limbs relative to one another at the desired angular curvature, in particular, by a material connection, preferably a welded connection. The second profile limb is oriented relative to the first profile limb along a different longitudinal orientation, such that the central longitudinal axes of the two profile limbs are oriented at an angle to one another. The angled orientation is not able to be changed, due to the dimensionally stable design of the carrier profile.

In a further embodiment, the fastening profiling and the support profiling are provided on opposite end regions of the carrier profile. The fastening profiling of the respective carrier profile is designed as a mechanical latching connection or plug connection which is preferably releasable or mountable without the use of tools. A preferred plug or latching connection is a bayonet closure arrangement.

In a further embodiment, each carrier profile is of one-part or multi-part design. In the case of a multi-part design, the individual parts of the carrier profile are assigned to one another in a fixed and dimensionally stable manner so that in the fully mounted state the individual parts are not able to be changed relative to one another. Encompassed by this embodiment is a folding or pivotably movable bearing of the parts of the carrier profile relative to one another with a corresponding dimensionally stable fixing of the parts relative to one another in the ready-for-operation mounted end position, which may not be changed in terms of orientation.

In a further embodiment, in the ready-for-operation mounted state the two support profilings of the carrier profiles form a carrier portion for holding at least one functional component of the rear carrier system. The carrier portion may be designed as a crossmember or as a prism-shaped or spherical carrier head. In the case of a prism-shaped or spherical carrier head it is possible to mount a holding device of a known rear carrier system without structural changes to the carrier profiles, since the spherical or prism-shaped carrier head may serve as a replacement for a trailer ball of a trailer hitch of the motor vehicle.

In a further embodiment, in the ready-for-operation mounted state the second profile limbs, which bear the support profilings, face one another. Preferably, in the ready-for-operation mounted state the support profilings overlap one another such that they form a carrier contour for fastening a holding device for functional components of the rear carrier system. The support profilings are designed such that in the ready-for-operation mounted state they complement one another to form a common carrier contour, wherein—viewed in the ready-for-operation mounted state—they preferably overlap one another in the vehicle transverse direction and in each case form a partial portion of the carrier contour. In the ready-for-operation mounted state these partial portions thus complement one another to form the desired carrier contour.

In a further embodiment, in the ready-for-operation mounted state the support profilings engage behind one another in the vertical direction at least in some sections, forming a mutual support stop which acts in the vertical direction. In the joined-together functional state the support profilings are accordingly positively supported downwardly—relative to a vehicle vertical direction—so that they are able to bear large payloads.

In a further embodiment, in the ready-for-operation mounted state of the profile limbs the carrier contour protrudes upwardly in the manner of a carrier head and the carrier contour in each case is formed in some sections by the support profilings of both profile limbs. The support profilings overlap one another in the ready-for-operation mounted state and are positively supported against one another. As the support profilings in each case partially form the carrier contour in the manner of a carrier head, it is possible to compensate for tolerances in a simple manner.

In a further embodiment, the fastening profiling of each first profile limb of each carrier profile and the assigned carrier receiver, which is fixed to the vehicle, are designed as complementary bayonet closure portions of a bayonet closure arrangement which is designed such that in the ready-for-operation mounted rotary position of the first profile limb, the respective second profile limb is oriented so as to be aligned with the second profile limb of the respective other carrier profile. In this embodiment, the second profile limbs are preferably oriented in the transverse direction of the vehicle when they are located in the ready-for-operation rotated end position, and the first profile limbs are oriented in the longitudinal direction of the vehicle.

In a further embodiment, the support profilings of the opposing second profile limbs are oriented relative to one another such that with a rotation of the second profile limbs from an insertion position into the ready-for-operation rotated end position, the support profilings are forcibly inserted into one another. As a result, a particularly simple mounting and dismantling of the carrier functional components of the rear carrier system is achieved, since the two carrier profiles merely have to be inserted with their first profile limbs into the carrier receivers and then have to be rotated toward a vehicle center, whereby the positive overlap and blocking of the support profilings relative to one another inevitably results.

In a further embodiment, the bayonet closure portion of each carrier receiver (which is fixed to the vehicle) is provided with an end stop which corresponds to the ready-for-operation rotated end position of the first profile limbs. The respective bayonet closure arrangement is formed by a first bayonet closure portion in the region of the carrier receiver and by a second bayonet closure portion in the region of the first profile limb of each carrier profile. The bayonet closure portions of the carrier receivers which are fixed to the vehicle accordingly form an end stop for the bayonet closure portions of the first profile limbs on the carrier profile side.

In a further embodiment, the bayonet closure portions of the adjacent carrier receivers are oriented in opposing directions to one another. As a result, a transfer of the two carrier profiles into the ready-for-operation mounted end position is inevitably produced as soon as the carrier profiles after insertion are rotated in opposing directions to one another toward the vehicle center.

BRIEF DESCRIPTION OF THE DRAWINGS

Further advantages and features of the invention are revealed from the claims and from the following description of a preferred exemplary embodiment of the invention which is shown with reference to the drawings:

DETAILED DESCRIPTION

A passenger motor vehicle F has a rear region H to which a rear carrier system, described hereinafter in more detail with reference to FIGS. 1 to 9, is mounted. The passenger motor vehicle F is provided with a body supporting structure which in a rear region of the passenger motor vehicle F has corresponding body carrier parts such as, in particular, body crossmembers and body longitudinal members. The rear-side body carrier parts of the body supporting structure are concealed in the rear region H of the passenger motor vehicle F by rear cladding parts, such as in particular a rear fender. The rear cladding parts, not denoted in more detail, have on two opposing sides and level with the rear fender circular through-holes which may be concealed by cover panels, not shown in more detail. In each case a carrier receiver 1a, 1b which is fixed to the vehicle is provided, said carrier receiver being connected fixedly and in a force-transmitting manner to a body carrier part of the body supporting structure behind these through-holes. Each carrier receiver 1a, 1b forms a receiving region, the central longitudinal axis thereof being oriented in the longitudinal direction of the vehicle. The two opposing carrier receivers 1a, 1b which are fixed to the vehicle are oriented parallel to one another with respect to their central longitudinal axes of the receiving regions and thus in each case are oriented in the longitudinal direction of the vehicle.

Each carrier receiver 1a, 1b forms a bayonet closure portion in the form of a bayonet closure receiver 11 into which a correspondingly complementary bayonet closure portion 10 of a carrier profile 2a, 2b is insertable and is rotatable about the central longitudinal axis of the receiving region of the bayonet closure receiver and thus the carrier receiver 1a, 1b. The two bayonet closure receivers 11 for the carrier receiver 1a and the carrier receiver 1b are designed in opposing directions to one another but also identically to one another.

The two carrier receivers 1a and 1b serve for receiving in each case a carrier profile 2a, 2b, which are designed identically relative to their functional construction. Each carrier profile 2a, 2b is formed by a closed hollow profile, in the present case a cylindrical hollow profile, wherein each carrier profile 2a, 2b is curved at a right angle in an L-shaped manner, forming a first profile limb 5 and a second profile limb 6 adjoined thereto at a right angle. A fastening profiling 3a, 3b is assigned to each first profile limb 5 of each carrier profile 2a, 2b on a vehicle-side end, said fastening profiling being designed in the carrier profiles 2a, 2b in each case as a male bayonet closure portion 10. The male bayonet closure portion 10 is arranged on a front end region of the first profile limb 5 and for the mounting thereof is inserted coaxially into the receiving region of the bayonet closure receiver 11 of the carrier receiver 1a, wherein two sliding pins of the male bayonet closure portion 10 are introduced into corresponding sliding guides of the female bayonet closure receiver 11. The sliding guides of the bayonet closure receiver 11 are angled back clockwise at right angles in their rear-side end region, so that the sliding pins of the male bayonet closure portion of the first profile limb 5 may be blocked in these end regions of the sliding guides of the female bayonet closure receiver 11 by rotating the first profile limb 5 clockwise. The male bayonet closure portion of the right-hand carrier profile 2b in the figures is designed identically to the bayonet closure portion of the left-hand carrier profile 2a. Moreover, the female bayonet closure receiver of the right-hand carrier receiver 1b has, similar to the left-hand carrier receiver 1a, two sliding guides which in their end region are angled-back at right angles in the peripheral direction. However, in the views of the drawings, the sliding guides of the right-hand carrier receiver 1b are angled back counterclockwise so that the sliding pins of the male bayonet closure portion of the first profile limb 5 of the right-hand carrier profile 2b have to be rotated counterclockwise after the insertion thereof in order to reach the blocked end position.

Each carrier profile 2a and 2b additionally has on a front end region of the respective second profile limb 6 remote from the respective first profile limb 5 in each case a support profiling 4a and 4b, which are designed functionally identically but embodied mirror-symmetrically relative to a vertical vehicle transverse plane. Each support profiling 4a and 4b is fixedly connected to the respective second profile limb 6 and has a projection 7a which protrudes coaxially to the second profile limb 6 and which has on one half a semi-cylindrical profile portion and on the other half a receiver projection provided with an upwardly open receiving groove 12b. The receiver projection is designed to be shorter relative to the semi-cylindrical profile portion. A carrier portion 9a, 9b is additionally located on the semi-cylindrical profile portion. The two carrier portions 9a and 9b complement one another in the ready-for-operation mounted state (FIG. 9) to form a common carrier contour which is designed as an upwardly protruding carrier head in the ready-for-operation mounted state. In this case, each carrier portion 9a and 9b in each case forms a half of this carrier head relative to the vertical vehicle transverse plane. Each semi-cylindrical profile portion of the support profilings 4a and 4b is additionally provided with a support pin 8a which extends parallel to a central longitudinal axis of the respective second profile limb 6 and freely protrudes on the front face out of the respective support profiling 9a, 9b. The support pin 8a is adapted to the support receiver or groove 12b of the opposing carrier profile 2a, 2b. The support receiver 12b, which is not identifiable relative to the carrier profile 2a and accordingly also has not received a dedicated reference numeral, may be provided with a resiliently flexible latching element, in particular with a correspondingly designed leaf spring. As a result, an additional resistance is produced when latching the respective support pin 8a into the support receiver or groove 12b, which signals to an operator that the ready-for-operation mounted end position is reached. Each support receiver 12b is upwardly open relative to the opposing support profiling but downwardly closed, whereby a support stop is produced downwardly in the vertical direction for the support pin 8a of the opposing support profiling.

Figure 1:
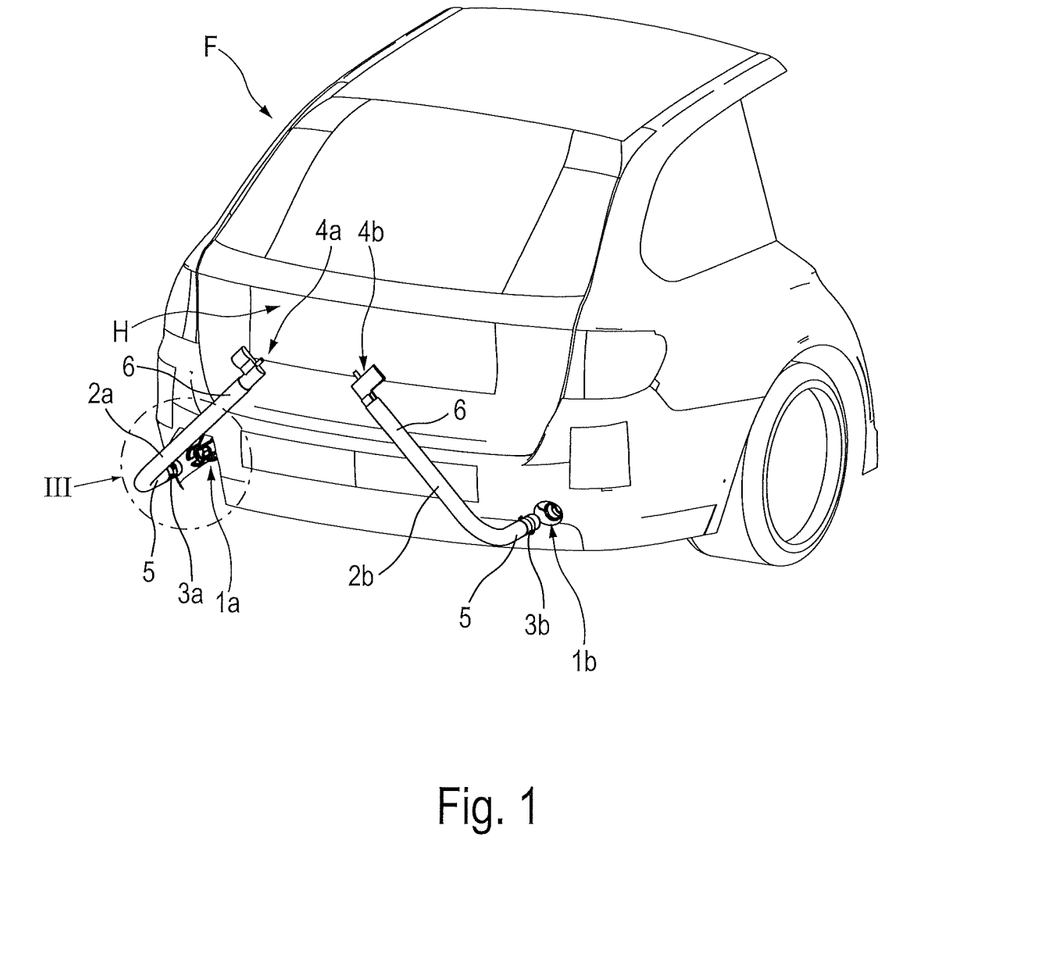
FIG. 1 shows in a perspective view a rear region of a passenger motor vehicle with an embodiment of a rear carrier system according to the invention, in which corresponding carrier profiles are shown in an exploded view.
Figure 2:
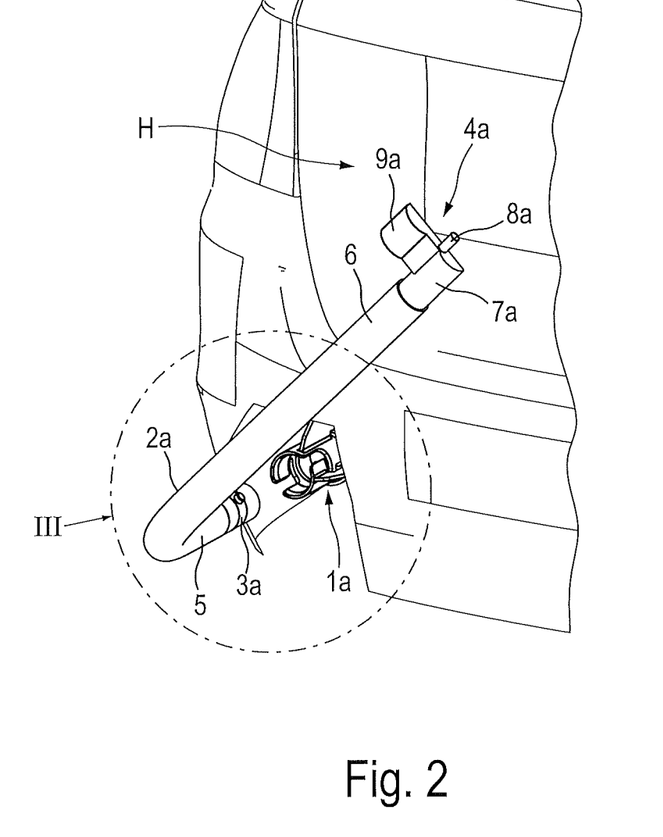
FIG. 2 shows in an enlarged view a partial region of a detail on the left in FIG. 1 of the view according to FIG. 1.
Figure 3:
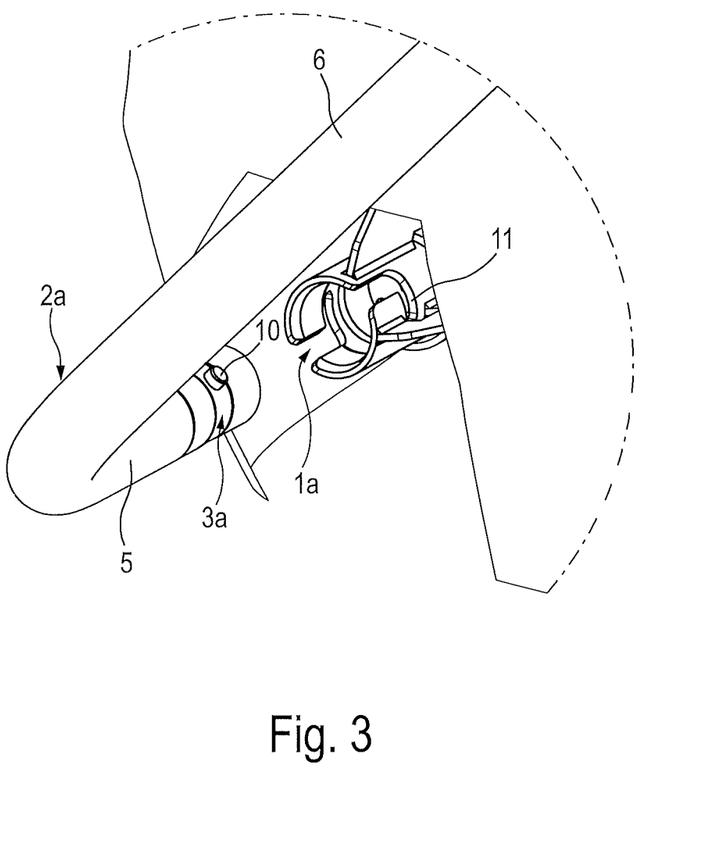
FIG. 3 shows an enlarged detail III of the views according to FIGS. 1 and 2.
Figure 4:
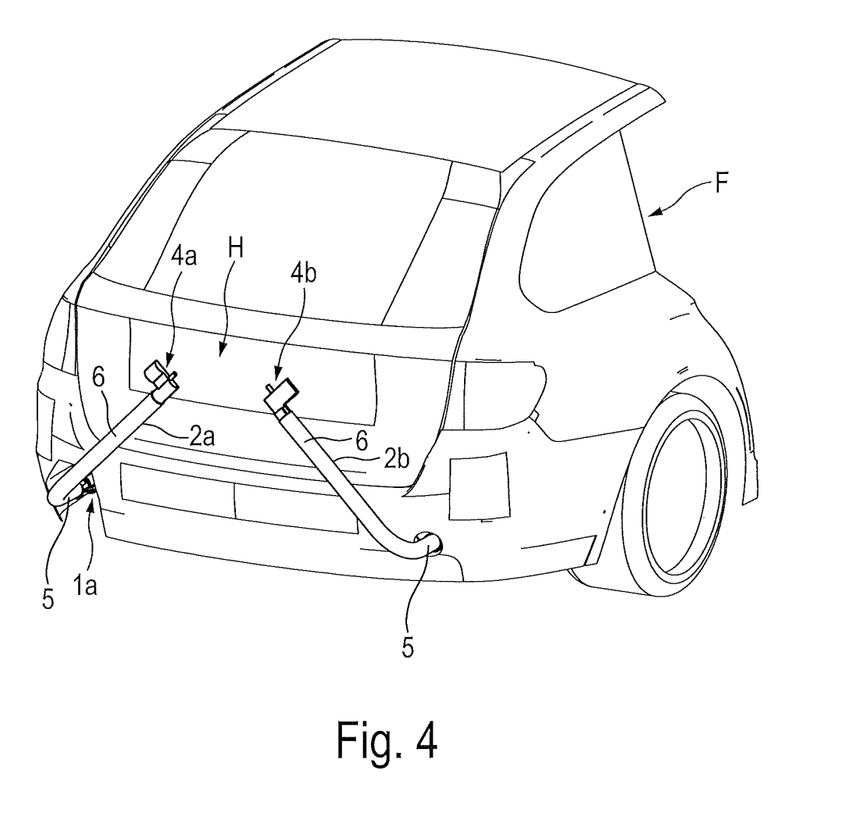
FIG. 4 shows the passenger motor vehicle according to FIG. 1 with the carrier profiles of the rear carrier system according to FIG. 1 located in an intermediate position.
Figure 5:
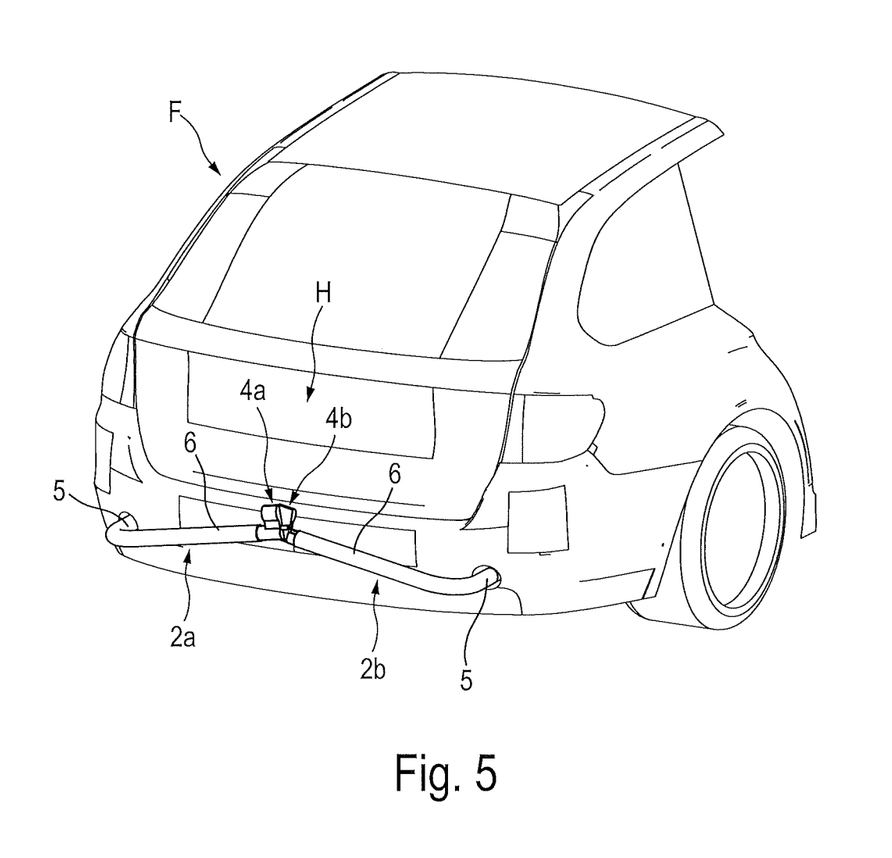
FIG. 5 shows the rear of the passenger motor vehicle according to FIGS. 1 and 4, wherein the carrier profiles are located in a further intermediate position.
Figure 6:
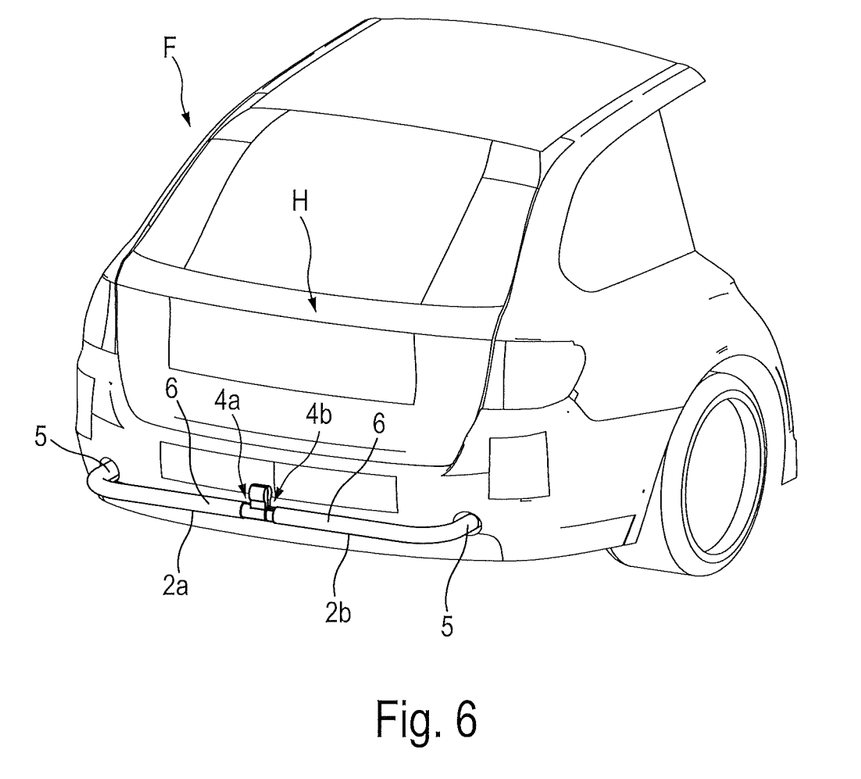
FIG. 6 shows the passenger motor vehicle according to FIGS. 1, 4 and 5, wherein the carrier profiles are located in a ready-for-operation mounted end position.
Figure 7:
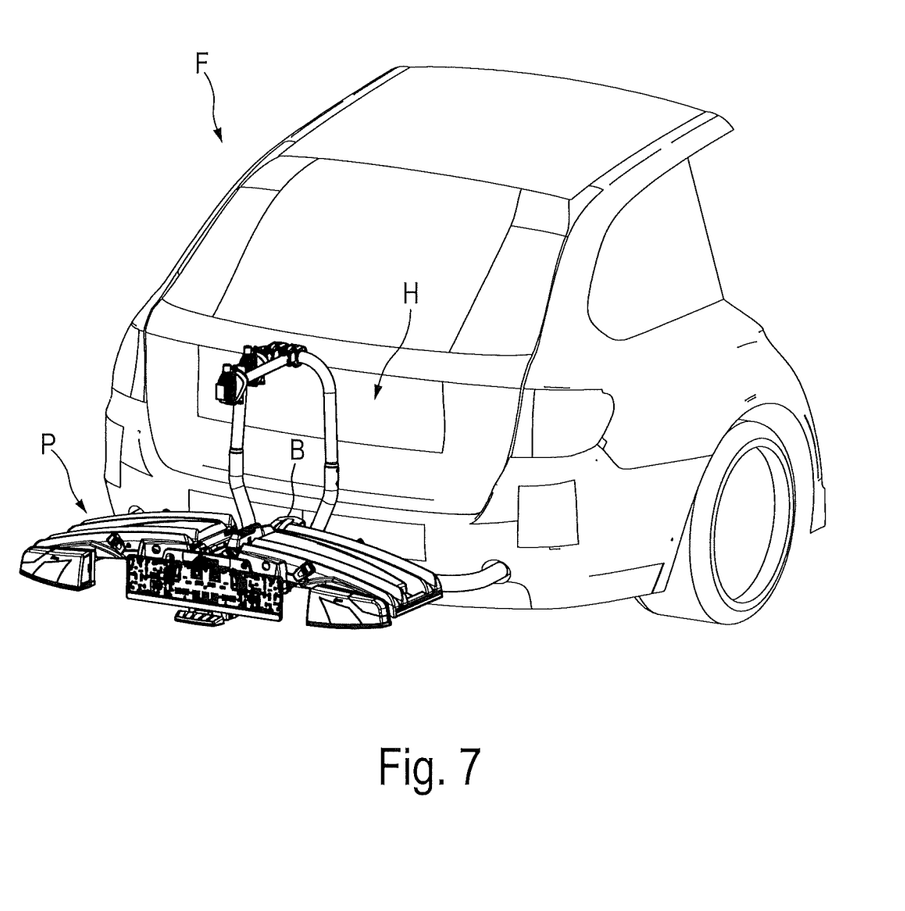
FIG. 7 shows the view according to FIG. 6 but with further functional components of the rear carrier system in the ready-for-operation mounted state.
Figure 8:
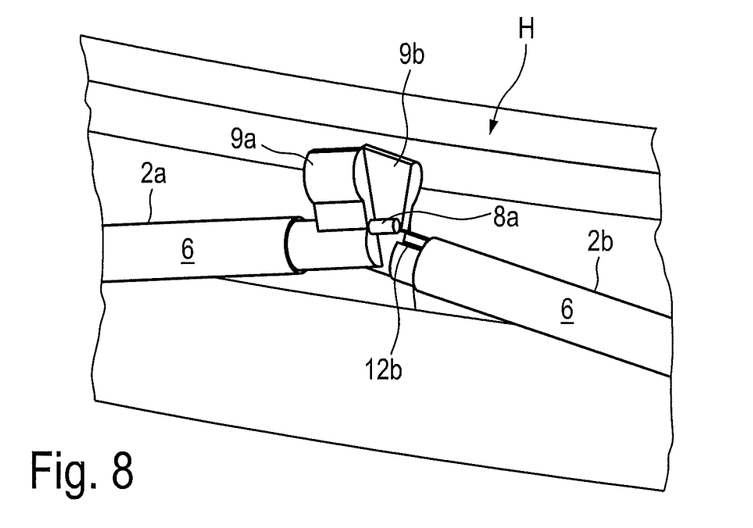
FIG. 8 shows in a highly enlarged view a detail of the intermediate position according to FIG. 5.
Figure 9:
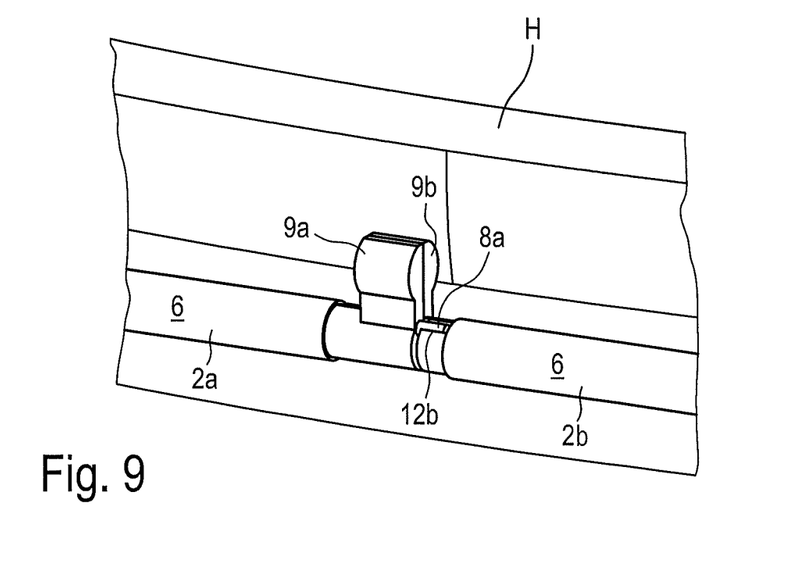
FIG. 9 shows in a highly enlarged view a detail of the ready-for-operation mounted end position according to FIG. 6.

If the two carrier profiles 2a, 2b are now oriented in the position according to FIGS. 1 to 3, in which the two carrier profiles are oriented at an acute angle from a horizontal vehicle transverse plane, and are inserted with their fastening profilings 3a and 3b into the carrier receivers 1a and 1b, the sliding pins of the male bayonet closure portions of both fastening profiles 3a and 3b initially slide in the longitudinal direction of the vehicle into the sliding guides of the female bayonet closure receivers of the carrier receivers 1a and 1b towards the vehicle front, until the sliding pins have reached the end regions of the sliding guides. Thus, an intermediate position according to FIG. 4 is reached. Then, the two carrier profiles 2a and 2b are rotated relative to one another in opposite directions toward the center, wherein the sliding pins of the male bayonet closure portions slide along in the sliding portions of the sliding guides of the female bayonet closure receivers running in the peripheral direction. Just before reaching a horizontal position (FIG. 5) the support profilings 4a, 4b of the two carrier profiles 2a and 2b start to overlap one another in the vehicle transverse direction (see also FIG. 8). With further pivoting in opposite directions the support pins 8a are introduced into the respective support receivers 12b. The support pins 8a have reached the end stop in the support receivers 12b when the bayonet closure arrangements also have reached their end-side rotated position. In this end position according to FIGS. 6 and 9, the carrier portions 9a and 9b of the support profilings 4a and 4b overlap one another in parallel, such that they are aligned with one another in the longitudinal direction of the vehicle and in each case jointly represent one half of a carrier contour forming the carrier head. The carrier portions protrude upwardly relative to the second profile limbs 6, as may be identified clearly from the drawings. The carrier profiles 2a and 2b are thus rotated between the insertion position and the rotated end position by less than 90°.

In this ready-for-operation mounted end position, therefore, further functional components of the rear carrier system may be fastened to the carrier head formed by the support profilings 4a and 4b. As may be seen with reference to FIG. 7, a functional platform P for holding a plurality of bicycles may be mounted by means of a fastening device B on the carrier head of the support profilings 4a and 4b. The fastening device B corresponds to a fastening device which is configured to be mounted on a trailer ball of a trailer hitch. The fixing of the fastening device B of the functional platform P of the rear carrier system to the carrier head formed by the carrier portions 9a and 9b brings about an additional fixing of the two carrier portions 9a and 9b, and thus of the two carrier profiles 2a and 2b relative to one another.

If the rear carrier system is to be dismantled again, the fastening device B is released and the functional platform P removed in a simple manner. Then, the two carrier profiles 2a and 2b are preferably grasped directly adjacent to the support profilings 4a and 4b and pulled upwardly in a simple manner by an operator. As a result, the carrier profiles 2a and 2b are forcibly pivoted relative to one another again in opposite directions. As soon as they have reached again the mounting position according to FIGS. 1 and 4, the carrier profiles 2a and 2b may be pulled out again from the carrier receivers 1a and 1b. A mounting and dismantling of the carrier profiles is accordingly carried out in each case without the use of tools.

The invention claimed is:

1. A rear carrier system for a motor vehicle, the rear carrier system comprising:
   two carrier receivers fixed to the vehicle; and
   two carrier profiles having respective vehicle-side end regions each including a fastening profiling, the carrier profiles being releasably fastened by the respective fastening profilings to the respective carrier receivers in a ready-for-operation mounted state, each carrier profile including a support profiling disposed at a distance from the fastening profiling, the support profilings being supported against one another in the ready-for-operation mounted state of the carrier profiles, each carrier profile being curved at an angle and having a first profile limb and an angled-back second profile limb, and the fastening profiling of each carrier profile being arranged on the first profile limb and each support profiling of each carrier profile being arranged on the angled-back second profile limb.

2. The rear carrier system as claimed in claim 1, wherein each carrier profile has the fastening profiling and the support profiling provided on opposite end regions.

3. The rear carrier system as claimed in claim 1, wherein each carrier profile is of a one-part or multi-part design.

4. The rear carrier system as claimed in claim 1, wherein in the ready-for-operation mounted state the support profilings of the respective carrier profiles each form a carrier portion for holding at least one functional component of the rear carrier system.

5. The rear carrier system as claimed in claim 1, wherein the support profilings face one another in the ready-for-operation mounted state.

6. The rear carrier system as claimed in claim 1, wherein the fastening profiling of each first profile limb of each carrier profile and the corresponding carrier receiver are configured as complementary bayonet closure portions of a bayonet closure arrangement, each first profile limb having a ready-for-operation rotated end position, and the second profile limbs being oriented in alignment with one another when the first profile limbs are oriented in the respective ready-for-operation rotated end positions.

7. The rear carrier system as claimed in claim 6, wherein the support profilings of the respective second profile limbs are oriented relative to one another such that with a rotation of the first profile limbs from an insertion position into the corresponding ready-for-operation rotated end position, portions of the support profilings are forcibly inserted into one another.

8. The rear carrier system as claimed in claim 6, wherein the bayonet closure portion of each carrier receiver includes an end stop defining the ready-for-operation rotated end position of the corresponding first profile limb.

9. The rear carrier system as claimed in claim 6, wherein the bayonet closure portion of one of the carrier receivers is configured such that the first profile limb fastened thereto is rotated in a first direction into its ready-for-operation rotated end position and the bayonet closure portion of the other of the carrier receivers is configured such that the first profile limb fastened thereto is rotated in a second direction into its ready-for-operation rotated end position, the first direction being opposite to the second direction.

10. A rear carrier system for a motor vehicle, the rear carrier system comprising:
    two carrier receivers fixed to the vehicle; and
    two carrier profiles having respective vehicle-side end regions each including a fastening profiling, the carrier profiles being releasably fastened by the respective fastening profilings to the respective carrier receivers in a ready-for-operation mounted state, each carrier profile including a support profiling disposed at a distance from the fastening profiling, the support profilings being supported against one another in the ready-for-operation mounted state of the carrier profiles, the support profilings being configured in a complementary manner with one another and in the ready-for-operation mounted state the support profilings overlap one another and together form a common carrier contour for fastening a holding device for functional components of the rear carrier system.

11. The rear carrier system as claimed in claim 10, wherein in the ready-for-operation mounted state the support profilings engage one another in a vertical direction and form respective mutual support stops acting in the vertical direction.

12. The rear carrier system as claimed in claim 10, wherein in the ready-for-operation mounted state, the common carrier contour protrudes upwardly and forms a carrier head.

13. The rear carrier system as claimed in claim 10, wherein the fastening profiling of each first profile limb of each carrier profile and the corresponding carrier receiver are configured as complementary bayonet closure portions of a bayonet closure arrangement, each first profile limb having a ready-for-operation rotated end position, and the second profile limbs being oriented in alignment with one another when the first profile limbs are oriented in the respective ready-for-operation rotated end positions.

14. The rear carrier system as claimed in claim 13, wherein the support profilings of the respective second profile limbs are oriented relative to one another such that with a rotation of the first profile limbs from an insertion position into the corresponding ready-for-operation rotated end position, portions of the support profilings are forcibly inserted into one another.

15. The rear carrier system as claimed in claim 13, wherein the bayonet closure portion of each carrier receiver includes an end stop defining the ready-for-operation rotated end position of the corresponding first profile limb.

16. The rear carrier system as claimed in claim 13, wherein the bayonet closure portion of one of the carrier receivers is configured such that the first profile limb fastened thereto is rotated in a first direction into its ready-for-operation rotated end position and the bayonet closure portion of the other of the carrier receivers is configured such that the first profile limb fastened thereto is rotated in a second direction into its ready-for-operation rotated end position, the first direction being opposite to the second direction.

17. A rear carrier system for a motor vehicle, the rear carrier system comprising:
    two carrier receivers fixed to the vehicle; and
    two carrier profiles having respective vehicle-side end regions each including a fastening profiling, the carrier profiles being releasably fastened by the respective fastening profilings to the respective carrier receivers in a ready-for-operation mounted state, each carrier profile including a support profiling disposed at a distance from the fastening profiling, the support profilings being supported against one another in the ready-for-operation mounted state of the carrier profiles, the support profilings engaging one another in a vertical direction and forming respective support stops for one another acting in the vertical direction in the ready-for-operation mounted state.

\* \* \* \* \*